(12) United States Patent
Albrecht et al.

(10) Patent No.: US 10,549,770 B2
(45) Date of Patent: Feb. 4, 2020

(54) METHOD FOR STEERING A VEHICLE

(71) Applicant: Bayerische Motoren Werke Aktiengesellschaft, Munich (DE)

(72) Inventors: Johannes Albrecht, Taufkirchen (DE); Matthias Schoelzel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 154 days.

(21) Appl. No.: 15/887,442

(22) Filed: Feb. 2, 2018

(65) Prior Publication Data
US 2018/0154924 A1 Jun. 7, 2018

Related U.S. Application Data

(63) Continuation of application No. PCT/EP2016/067684, filed on Jul. 25, 2016.

(30) Foreign Application Priority Data

Aug. 6, 2015 (DE) .......................... 10 2015 215 052

(51) Int. Cl.
| | | |
|---|---|---|
| *B62D 6/00* | (2006.01) | |
| *B62D 1/28* | (2006.01) | |
| *B62D 15/02* | (2006.01) | |

(52) U.S. Cl.
CPC .......... *B62D 1/286* (2013.01); *B62D 15/025* (2013.01); *B62D 6/008* (2013.01)

(58) Field of Classification Search
CPC ....... B62D 1/286; B62D 15/025; B62D 6/008
(Continued)

(56) References Cited

U.S. PATENT DOCUMENTS

| | | | | |
|---|---|---|---|---|
| 6,050,359 A | * | 4/2000 | Mouri ................... | B62D 1/286 180/415 |
| 2013/0079991 A1 | * | 3/2013 | Schmidt .................. | B62D 6/00 701/42 |

(Continued)

FOREIGN PATENT DOCUMENTS

| | | |
|---|---|---|
| DE | 198 08 100 A1 | 10/1998 |
| DE | 10 2005 057 251 A1 | 6/2007 |

(Continued)

OTHER PUBLICATIONS

International Search Report (PCT/ISA/210) issued in PCT Application No. PCT/EP2016/067684 dated Oct. 21, 2016 with English translation (six pages).

(Continued)

*Primary Examiner* — Shardul D Patel
(74) *Attorney, Agent, or Firm* — Crowell & Moring LLP

(57) ABSTRACT

A method for steering a vehicle, wherein forces for steering wheels are generated by a steering torque. The steering torque is applied by a mechanical steering system and/or a steering actuator. The method includes in the automatic phase: automatic steering of the vehicle, where a control unit calculates an automatic torque and actuates the steering actuator so that the steering torque corresponds to the automatic torque. During the engagement phase when a manual torque applied to the steering wheel by the driver is detected, the method includes maintaining the calculated automatic torque as a steering torque by ignoring or compensating the manual torque until the manual torque has exceeded a defined threshold torque greater than zero. During a transfer phase, the method includes reducing the automatic torque after exceeding the threshold torque, wherein the steering torque corresponds to the sum of the manual torque and automatic torque.

14 Claims, 3 Drawing Sheets

(58) Field of Classification Search
USPC .......................................................... 701/41
See application file for complete search history.

(56) References Cited

U.S. PATENT DOCUMENTS

| | | | |
|---|---|---|---|
| 2015/0019082 A1* | 1/2015 | Inoue | B62D 1/286 |
| | | | 701/41 |
| 2017/0137060 A1* | 5/2017 | Wanner | B62D 1/166 |
| 2018/0154924 A1* | 6/2018 | Albrecht | B62D 15/025 |

FOREIGN PATENT DOCUMENTS

| | | |
|---|---|---|
| DE | 10 2008 002 669 A1 | 1/2010 |
| DE | 10 2011 111 897 A1 | 2/2013 |
| DE | 10 2012 112 442 A1 | 6/2014 |
| DE | 10 2014 107 194 A1 | 11/2015 |
| EP | 2 253 499 A1 | 11/2010 |
| EP | 2 821 319 A1 | 1/2015 |

OTHER PUBLICATIONS

German-language Written Opinion (PCT/ISA/237) issued in PCT Application No. PCT/EP2016/067684 dated Oct. 21, 2016 (seven pages).

German-language Search Report issued in counterpart German Application No. 10 2015 215 052.6 dated Mar. 1, 2016 with partial English translation (10 pages).

\* cited by examiner

METHOD FOR STEERING A VEHICLE

CROSS REFERENCE TO RELATED APPLICATIONS

This application is a continuation of PCT International Application No. PCT/EP2016/067684, filed Jul. 25, 2016, which claims priority under 35 U.S.C. § 119 from German Patent Application No. 10 2015 215 052.6, filed Aug. 6, 2015, the entire disclosures of which are herein expressly incorporated by reference.

BACKGROUND AND SUMMARY OF THE INVENTION

The invention relates to a method for steering a vehicle and to a vehicle for carrying out the method.

The invention relates in particular to a control of a steering system for passenger cars with a motor for providing steering assistance or for steering alone (steer-by-wire). The motor is partially or entirely used to perform the transverse guidance of the vehicle by means of a vehicle-specific control process. So that the driver is able at any time to take over the steering function again completely, automatic transverse guidance of the vehicle is deactivated by means of closed-loop steering control after a steering intervention by the driver has been detected.

In known steering systems with an electronic closed-loop steering control unit which sets a predefined travel trajectory by means of automatic steering interventions, the automatic steering intervention is usually also ended at the transition of the automatic closed-loop steering control from the switched-on state into the switched-off state. It follows from this that the steering torque which is applied to the steering system by the automatic steering intervention is initially reduced in a jolting fashion until the steering torque which is present at the steering system allows the steering torque in the steering system to increase again solely on the basis of the manual torque applied to the steering wheel by the driver. This jolting sudden decrease in the steering torque gives rise to a perceptible reduction in the curvature of the travel trajectory which is set by the closed-loop steering control unit and which does not correspond, with regards to value and direction, to the change in curvature which is expected by the driver and indicated by his manual steering intervention.

An object of the present invention is to provide a method for steering a vehicle which permits safe operation of the vehicle. In particular, an object of the invention is to prevent, in the case of manual steering intervention by the driver during an automatic steering intervention by a switched-on closed-loop steering control, a sudden decrease in the curvature of the previously automatically set travel trajectory.

The object is achieved in accordance with embodiments of the invention.

According to the invention, a method is provided for steering a vehicle. The forces for steering the wheels of the vehicle are generated by a steering torque which is referred to below as $M_L$. The steering torque $M_L$ is applied by way of a mechanical steering system and/or a steering actuator.

In the case of a conventional steering system, that is to say a mechanical connection between the steering wheel and the steered wheels, the steering actuator generates an additional torque which is directed in the opposite direction to or the same direction as the manual torque applied by the driver. In this context, the steering actuator is comparable to the drive of a power steering system. Given corresponding actuation, the steering actuator can also be used to steer the motor vehicle automatically. This does not require any manual torque.

As an alternative to the conventional steering system, a steer-by-wire system can also be used. In the case of a steer-by-wire system, there is no mechanical connection between the steering wheel and the wheels. The manual torque is merely sensed by means of a sensor and transmitted to the steering actuator.

In the method according to the invention, the vehicle is firstly operated in an automatic phase. In this context, automatic steering of the vehicle is carried out by a control unit calculating an automatic torque $M_{AF}$. During the automatic phase, the steering actuator is actuated in order to generate precisely this calculated automatic torque M. During the automatic phase, the driver does not apply any manual torque $M_{MF}$ to the steering wheel. The steering torque $M_L$ correspondingly corresponds to the automatic torque $M_{AF}$.

According to the invention, a driver intervention is sensed during the automatic phase. Furthermore, sensing of the applied manual torque $M_{MF}$ takes place. The sensing of the driver's intervention is advantageously carried out by sensing the manual torque M. Alternatively or additionally, the driver's intervention can also be sensed by further sensors or cameras.

As soon as the driver intervenes in the automatic steering system, the so-called intervention phase begins. In this context, the calculated automatic torque $M_{AF}$ is maintained as a steering torque $M_L$. This is done either by ignoring the manual torque $M_{MF}$ in the case of a steer-by-wire system or by compensating the manual torque $M_{MF}$ in the case of a conventional steering system. In this context, the automatic torque $M_{AF}$ drops or rises in order to compensate the manual torque $M_{MF}$. In the intervention phase, the activation of the steering wheel by the driver therefore has no effect whatsoever on the transverse steering of the vehicle.

The intervention phase lasts until the manual torque $M_{MF}$ has exceeded a defined threshold torque $M_S$. According to the invention, the threshold torque $M_S$ is greater than zero here.

After the intervention phase, the transfer phase follows. In the transfer phase the automatic torque $M_{AF}$ is reduced. The steering torque $M_L$ and therefore the actual transverse guidance of the vehicle therefore correspond to the sum of the manual torque $M_{MF}$ and the automatic torque $M_{AF}$.

Through the need to suppress the defined threshold torque $M_S$, the driver is provided with better haptic feedback that the system for automatic closed-loop steering control is active. A subsequent drop in the automatic torque $M_{AF}$ provides haptic feedback that the system is switched off and the driver is responsible for the steering function again.

The setting of a constant steering torque $M_L$ until the defined threshold torque $M_S$ is exceeded in the intervention phase ensures that the application of the threshold torque $M_S$ for switching off the automatic closed-loop steering control does not have any undesired effects on the automatic closed-loop steering control which is still active up until then.

There is preferably provision that during the transfer phase the automatic torque is reduced to zero in a continuous profile. This continuous reduction in the automatic torque $M_{AF}$ takes place over a time period which is longer than zero. The controlled reduction in the automatic closed-loop steering control permits the driver to take over the steering function without in the process experiencing an undesired change in the travel trajectory as a result of a sudden drop in the steering torque $M_L$.

There is preferably provision that in the intervention phase the automatic torque $M_{AF}$ is maintained as a steering torque $M_L$ both in the case of a manual torque $M_{MF}$ which is directed in the same direction as the automatic torque $M_{AF}$ and in the case of a manual torque $M_{MF}$ which is directed counter to the automatic torque $M_{AF}$. This means that even if the driver would like to steer counter to the automatic steering system, he must initially overcome the threshold torque $M_S$ until the automatic torque $M_{AF}$ is reduced.

There is preferably provision that the threshold torque $M_S$ decreases over time during the intervention phase. In this context, the threshold torque $M_S$ particularly preferably decreases digressively. By defining a chronologically variable value for the threshold torque $M_S$, it is possible to compensate unintended strong steering interventions without removing control of the vehicle from the driver. The system continues to remain active in the case of brief impacts.

In this context there is provision, in particular, that at the start of the intervention phase the threshold torque $M_S$ has an initial value and drops to a constant minimum value. The minimum value is greater than zero here. The initial value is advantageously at least 3 times, preferably at least 4 times, the minimum value. The minimum value ensures that even permanent unintended steering interventions by the driver do not cause the automatic system to switch off.

The invention also comprises a vehicle. The vehicle is, in particular, a two-track road vehicle. The vehicle is designed to carry out the described method. In particular, the vehicle comprises for this purpose a steering actuator which can be correspondingly actuated.

Other objects, advantages and novel features of the present invention will become apparent from the following detailed description of one or more preferred embodiments when considered in conjunction with the accompanying drawings.

DETAILED DESCRIPTION OF THE DRAWINGS

In the text which follows, an exemplary embodiment relating to the method according to the invention will be explained with reference to FIGS. 1 to 5.

The figures show a steering torque $M_L$. The forces for steering the wheels of the vehicle are generated by a steering torque which is referred to below as $M_L$.

In addition, the figures show an automatic torque M. The automatic torque $M_{AF}$ is calculated by a corresponding control unit of the vehicle. The automatic torque $M_{AF}$ predefines the forces for setting a desired trajectory of the vehicle. The automatic torque $M_{AF}$ is the steering torque, requested by the system, for the automatic closed-loop control of the transverse guidance. This results, for example, from sensing the underlying surface by sensor and/or from a navigation system.

Furthermore, the figures show a manual torque $M_{MF}$. The manual torque $M_{MF}$ is the manual steering torque applied by the driver, including all the additional steering torques which are based thereon and are requested by the steering system. These additional steering torques serve e.g. to assist the steering force or to form a defined steering sensation.

Before the time $t_0$, the vehicle is in the automatic phase. Automatic steering of the vehicle takes place here. The driver does not generate any manual torque $M_{MF}$ on the steering wheel.

At the time $t_0$, the driver generates a manual torque $M_{MF}$ at the steering wheel. When this manual torque $M_{MF}$ is sensed, the intervention phase begins. The intervention phase ends when a threshold torque $M_S$ is reached, therefore at the time $t_1$.

The intervention phase is followed by the transfer phase at the time $t_1$. In the transfer phase, the automatic torque $M_{AF}$ decreases continuously. The actual transverse guidance of the vehicle and therefore of the steering torque $M_L$ are determined more and more by the manual torque $M_{MF}$.

All the outlined torques are illustrated in such a way that, including possible transmission ratios, they correspond in their effect on the transverse guidance of the vehicle to a steering intervention by the driver.

Up to the time $t_0$, the entire torque $M_{L0}$ which is present at the steering system corresponds to the automatic torque $M_{AF0}$) which is requested by the automatic closed-loop steering control for the transverse guidance of the vehicle. Starting from the time $t_0$, the steering intervention is detected by the driver. The direction of the applied torque corresponds in FIG. 1 to the already present automatic torque $M_{AF}$—in this case the driver wishes to increase further the already set curvature of the travel trajectory. Up to the time $t_1$, the automatic torque $M_{AF}$ is set in such a way that with the increase in the manual torque $M_{MF}$ the steering torque $M_L$ remains in total constant at the level which is necessary to maintain the travel trajectory planned by the vehicle.

Figure 1:
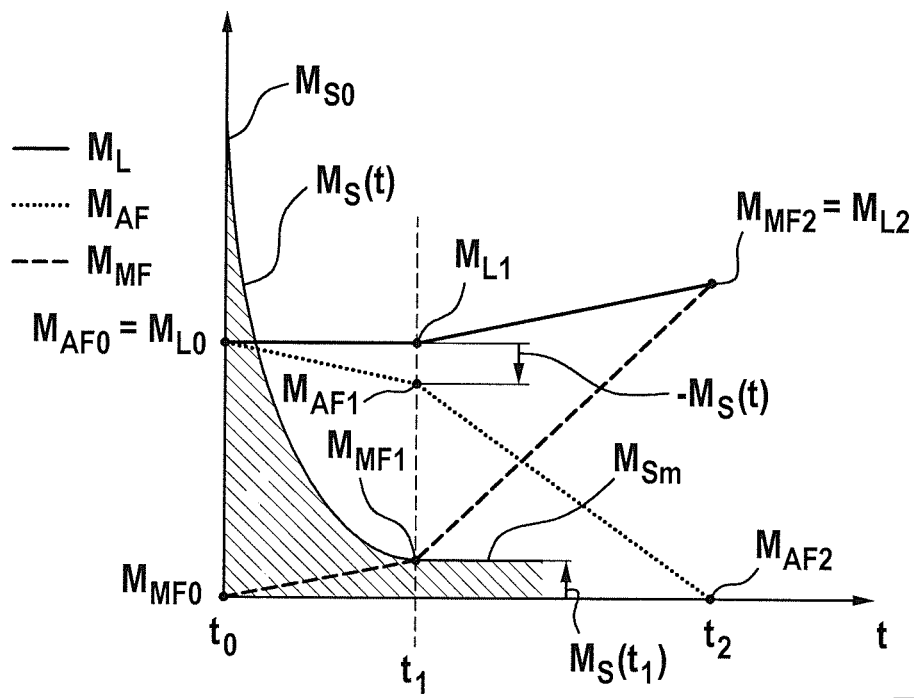
FIG. 1 is a schematic illustration relating to the method according to an embodiment of the invention with a transfer scenario when the curve radius is reduced.
Figure 2:
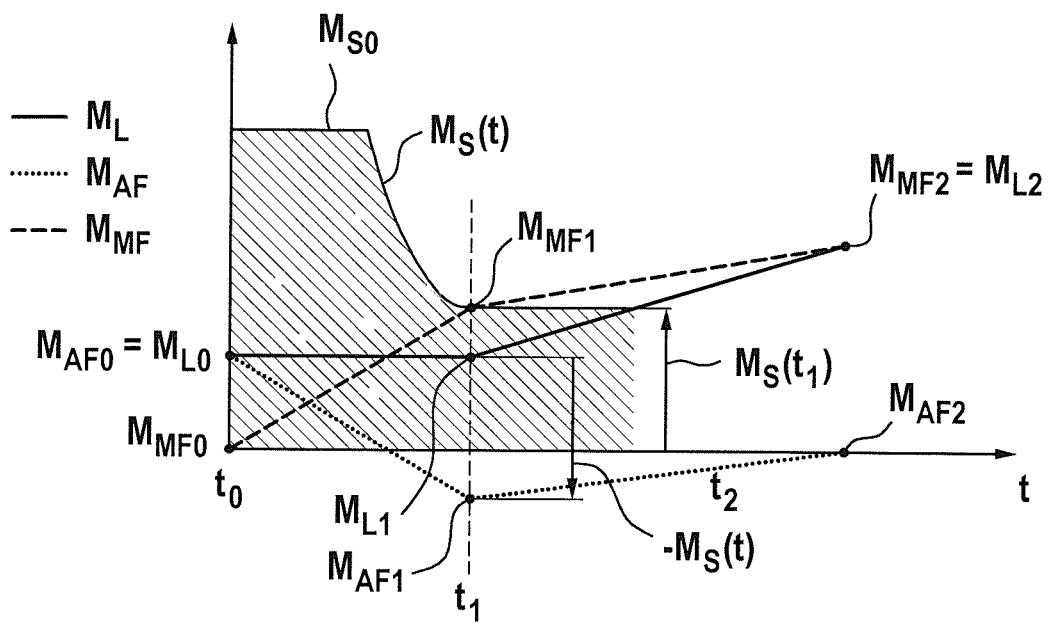
FIG. 2 is a schematic illustration relating to the method with an automatic torque $M_{AF}$ which is temporally directed in the opposite direction as the steering function.

The automatic torque $M_{AF}$ can also represent a torque which is directed in the opposite direction to the steering function, as illustrated in FIG. 2. The profile of the manual torque $M_{MF}$ and therefore also the profile of the automatic torque $M_{AF}$ is not defined by the system here and can vary greatly depending on the driver and the driving situation.

At the time $t_1$ the manual torque $M_{MF}$ exceeds a defined threshold value $M_S$. The automatic torque M for the automatic closed-loop steering control is then continuously reduced up to a time $t_2$, which corresponds to switching off the automatic function.

The time period between $t_1$ and $t_2$, and the time profile of the decreasing automatic torque $M_{AF}$, are to be selected here in such a way that the driver can assume in a controlled fashion the steering torque which is necessary for the desired curvature and is not surprised by a sudden decrease in the automatic torque $M_{AF}$. This means the reduction of the automatic torque $M_{AF}$ can be set to any desired profile through application.

The threshold torque $M_S$ which is necessary to assume the steering function by the driver is dependent on the time and drops from a high level until it assumes a constant minimum value $M_{Sm}$ after a defined time. The initial value $M_{S0}$ is selected in such a way that unintended manual intervention as a result of e.g. impacts are not misinterpreted as intentional driver inputs. The threshold value drops here to a constant value which is selected to be so low that it can be reached by any possible driver for transferring the steering function.

After the conclusion of the transfer by the driver, the manual torque $M_{MF}$ which is applied by the driver corresponds to the total steering torque $M_L$. The manual torque $M_{MF2}$ at the time $t_2$ is outlined in terms of absolute value by means of the steering torque $M_{L0}$ at the time $t_0$, since this corresponds to the original driver's request after relatively strong curvature of the travel trajectory.

The transfer by the driver can be indicated to the driver through an additional haptic feedback (e.g. vibration by means of an imbalance actuator in the steering wheel/steering train or servo motor of the steering system) in the time period between $t_0$ and $t_2$ at any time and over any desired period.

Figure 3:
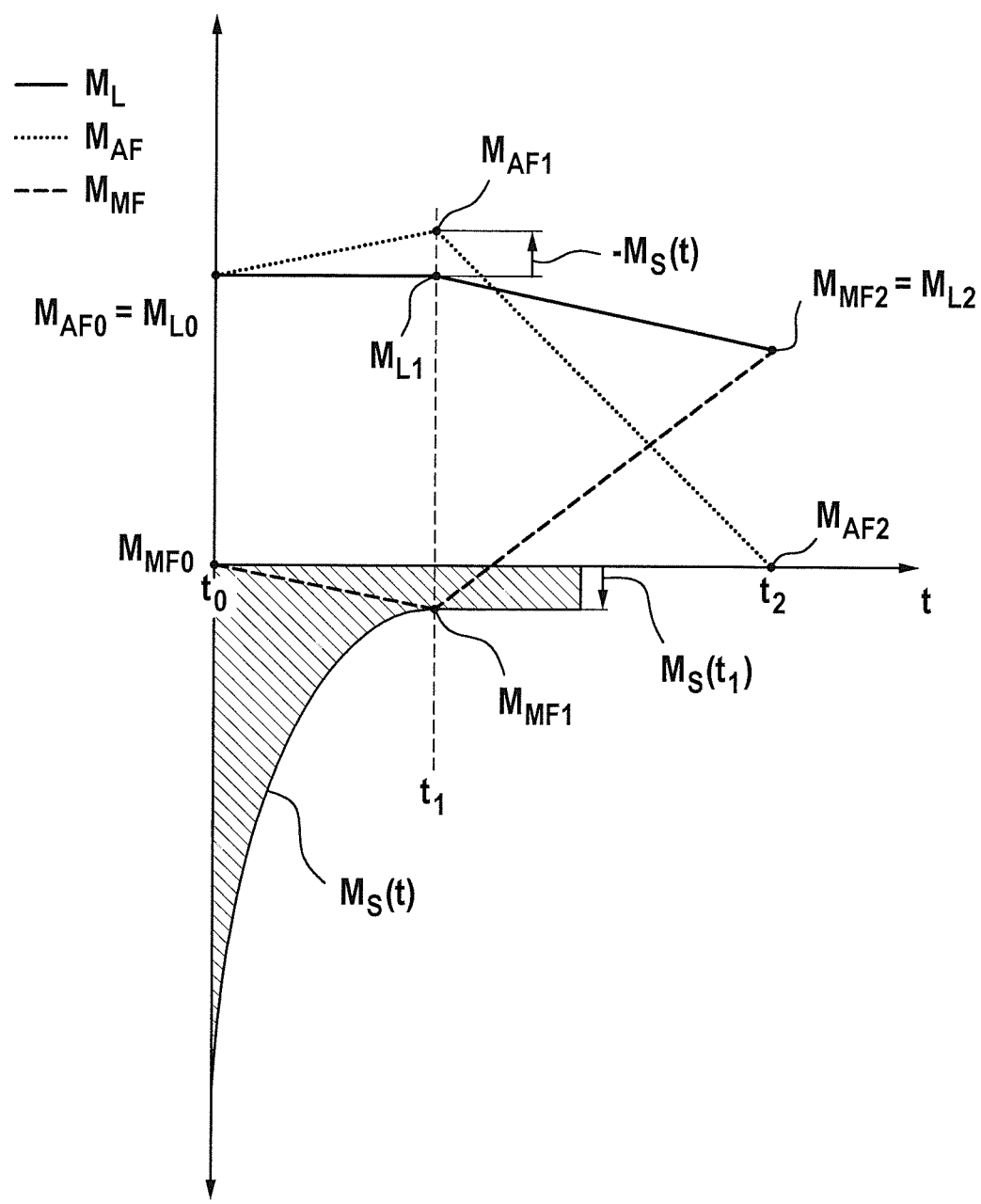
FIG. 3 is a schematic illustration relating to the method with a transfer scenario when the curve radius is increased.

FIG. 3 shows the profile of the torques for the case in which the manual torque $M_{MF}$ which is applied by the driver starting from the time $t_0$ is directed opposite to the direction of the already present automatic torque $M_{MF}$. In this case, the driver wishes to reduce the set curvature of the travel trajectory. The aimed-at manual torque $M_{MF2}$ is correspondingly outlined to be smaller in absolute terms than the steering torque $M_{L0}$ at the time $t_0$.

Figure 4:
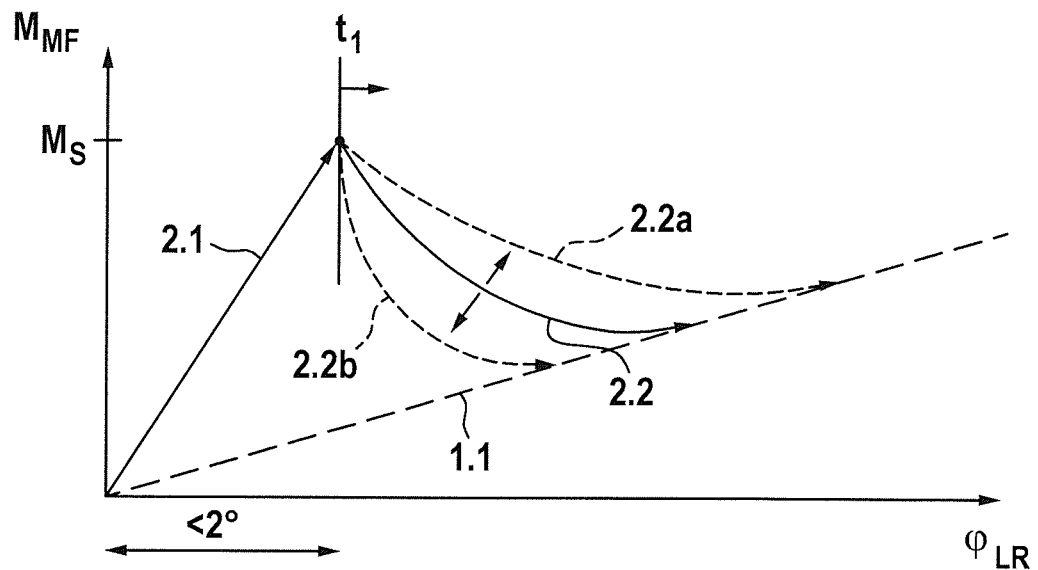
FIG. 4 is a schematic illustration relating to the method with a manual torque plotted against the steering angle and a comparison between oversteering and the profile in the case of non-assisted driving.

FIG. 4 shows the profile of the manual torque $M_{MF}$ relative to the steering wheel angle $\varphi_{LR}$ in the case of normal travel without additional systems (1.1) which assist the transverse guidance, in comparison with a profile during the oversteering of an active automatic closed-loop transverse guidance control by the driver (2.1 & 2.2). The illustration shows here an activated automatic transverse guidance about the zero position.

The profile of the manual torque $M_{MF}$ without an activated assistance system is outlined in a linear fashion with a slight increase plotted against the steering angle $\varphi_{LR}$ (1.1). In contrast to this, the profile in the case of an activated automatic transverse guidance shows a significantly steeper increase up to the time when the threshold torque $M_S$ is reached (2.1). The gradient of this increase corresponds here approximately to the torsional rigidity of all the elements of the steering train which are located in total between the steering wheel and the steering rack and which transmit the manual torque $M_{MF}$.

After the threshold torque $M_S$ has been reached at $t_1$, the manual torque $M_{MF}$ approximates, through the step-wise deactivation of the automatic transverse guidance, to a level which corresponds to the steering torque $M_L$ without activated assistance system (2.2). The profile of the manual torque $M_{MF}$ is greatly dependent here on the reaction of the driver and on the implementation of the function for the deactivation of the automatic transverse guidance, and is therefore variable (e.g. 2.2a & 2.2b).

Figure 5:
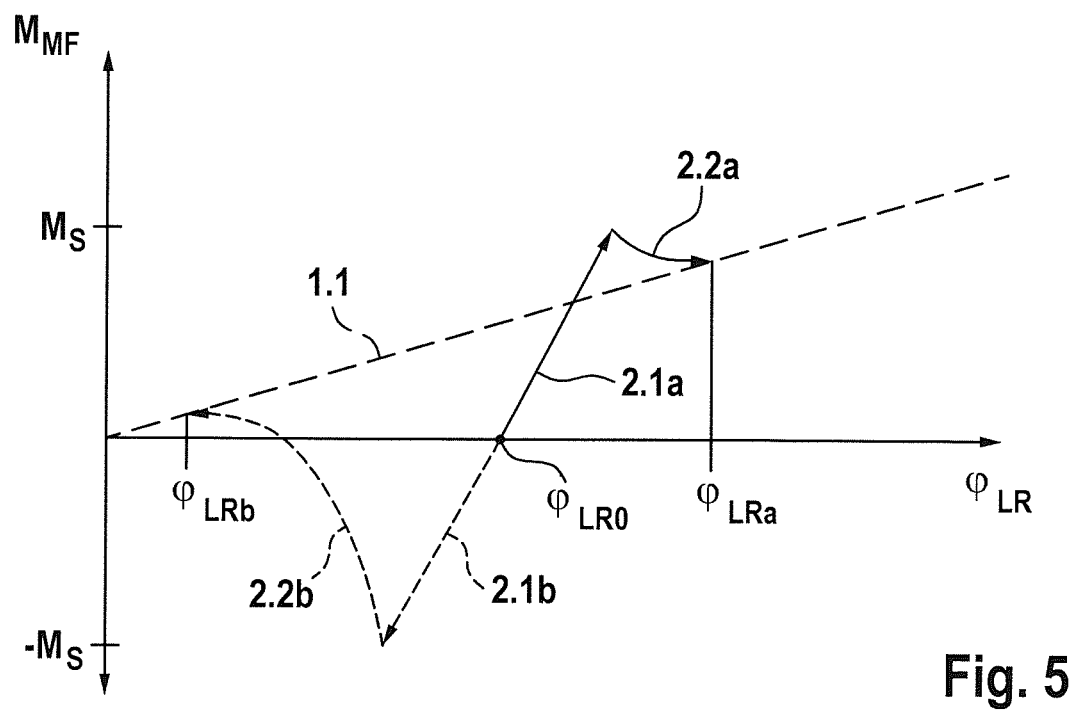
FIG. 5 is a schematic illustration relating to the method with the manual torque plotted against the steering angle and a transfer during cornering.

FIG. 5 shows manual torque profiles in the case of oversteering of an automatic transverse guidance during cornering. A steering angle $\varphi_{LR0}$ is already set at the steering wheel by the system here. The profiles 2.1a & 2.1b also show the (under certain circumstances negative) increase in the manual torque $M_{MF}$ up to the point when the threshold torque $M_S$ is reached in terms of absolute value. The profiles 2.2a & 2.2b in turn show the transition of the manual torque $M_{MF}$ to a value which corresponds to that without an activated assistance system for transverse guidance (1.1).

Here, 2.1a & 2.2a show the manual torque profile for the setting of a relatively large steering angle $\varphi_{LRa}$. 2.1b & 2.2b show the manual torque profile for the setting of a relatively small steering angle $\varphi_{LRb}$. As illustrated in FIG. 4, in FIG. 5 the profiles 2.2a & 2.2b are also greatly dependent on the reaction of the driver and of the implementation of the function for the deactivation of the automatic transverse guidance, and are therefore variable.

Through the need to suppress a defined threshold torque $M_S$, the driver is provided with better haptic feedback that the system for automatic closed-loop steering control is active. A subsequent drop in the automatic torque $M_{AF}$ provides haptic feedback that the system is switched off and the driver is responsible again for the steering function.

Setting a constant steering torque $M_L$ until the defined threshold torque $M_S$ is exceeded at $t_1$ ensures that the application of the threshold torque $M_S$ in order to switch off the automatic closed-loop steering control does not have any undesired effects on the automatic closed-loop steering which has been active until then.

By defining a chronologically variable value for the threshold torque $M_S$ it is possible to compensate unintended strong steering interventions without removing the control of the vehicle from the driver. The system continues to remain active in the case of brief impacts.

The controlled reduction in the automatic closed-loop steering control between $t_1$ and $t_2$ permits the driver to take over the steering function without in the process experiencing an undesired change in the travel trajectory as a result of a sudden decrease in the total steering torque.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for steering a vehicle, wherein forces for steering wheels of the vehicle are generated by a steering torque ($M_L$), and wherein the steering torque ($M_L$) is applied by a mechanical steering system and/or a steering actuator, the method comprising the steps of:
    (a) in an automatic phase, automatically steering the vehicle wherein a control unit calculates an automatic torque ($M_{AF}$) and actuates the steering actuator to apply the automatic torque ($M_AF$), with a result that the steering torque ($M_L$) corresponds to the automatic torque ($M_AF$), wherein a driver intervention is detected during the automatic phase, and a manual torque ($M_{MF}$) which is applied to the steering wheel by the driver is detected;
    (b) in an intervention phase, maintaining the calculated automatic torque ($M_AF$) as a steering torque ($M_L$) through ignoring or compensating the manual torque ($M_{MF}$) until the manual torque (MMF) has exceeded a defined threshold torque (Ms), wherein the defined threshold torque (Ms) is greater than zero and decreases over time during the intervention phase; and
    (c) in a transfer phase, reducing the automatic torque ($M_AF$) after the defined threshold torque (Ms) has been exceeded, wherein the steering torque ($M_L$) corresponds to a sum of the manual torque ($M_MF$) and automatic torque ($M_AF$).

2. The method as claimed in claim 1, wherein the defined threshold torque ($M_S$) decreases digressively.

3. The method as claimed in claim 1, wherein
    the defined threshold torque ($M_S$) has an initial value ($M_{S0}$) at a start of the intervention phase and drops to a constant minimum value ($M_{Sm}$), wherein the constant minimum value ($M_{Sm}$) is greater than zero.

4. The method as claimed in claim 3, wherein the initial value ($M_{S0}$) is at least 3 times the minimum value ($M_{Sm}$).

5. The method as claimed in claim 3, wherein the initial value ($M_{S0}$) is at least 4 times the minimum value ($M_{Sm}$).

6. The method as claimed in claim 1, wherein during the transfer phase, the automatic torque ($M_{AF}$) is reduced to zero in a continuous profile.

7. The method as claimed in claim 6, wherein in the intervention phase, the automatic torque ($M_{AF}$) is maintained as the steering torque ($M_L$) both in a case of a manual torque ($M_{MF}$) which is directed in a same direction as the automatic torque ($M_{AF}$) and in a case of a manual torque ($M_{MF}$) which is directed counter to the automatic torque ($M_{AF}$).

8. The method as claimed in claim 1, wherein in the intervention phase, the automatic torque ($M_{AF}$) is maintained as the steering torque ($M_L$) both in a case of a manual torque ($M_{MF}$) which is directed in a same direction as the automatic torque ($M_{AF}$) and in a case of a manual torque ($M_{MF}$) which is directed counter to the automatic torque ($M_{AF}$).

9. The method as claimed in claim 1, wherein the vehicle is configured for steer-by-wire steering, only the steering actuator generates the steering torque ($M_L$), and in the intervention phase, the manual torque ($M_{MF}$) is ignored during the actuation of the steering actuator.

10. The method as claimed in claim 1, wherein the vehicle comprises a mechanical connection between the steering wheel and the wheels, and in the intervention phase, the manual torque ($M_{MF}$) is compensated during the actuation of the steering actuator.

11. A vehicle that carries out the method as claimed in claim 1.

12. The vehicle as claimed in claim 11, wherein the vehicle is a two-track vehicle.

13. The vehicle as claimed in claim 12, wherein the vehicle is configured for steer-by-wire steering, only the steering actuator generates the steering torque ($M_L$), and in the intervention phase, the manual torque ($M_{MF}$) is ignored during the actuation of the steering actuator.

14. The vehicle as claimed in claim 12, wherein the vehicle comprises a mechanical connection between the steering wheel and the wheels, and in the intervention phase, the manual torque ($M_{MF}$) is compensated during the actuation of the steering actuator.

* * * * *